United States Patent

Komatsu et al.

[11] Patent Number: 4,770,120
[45] Date of Patent: Sep. 13, 1988

[54] PLATE MEMBER LOCATING-AND-FEEDING SYSTEM

[75] Inventors: Masanobu Komatsu; Shigeo Okamizu, both of Hiroshima, Japan

[73] Assignee: Mazda Motor Corporation, Japan

[21] Appl. No.: 924,731

[22] Filed: Oct. 30, 1986

[30] Foreign Application Priority Data

Oct. 31, 1985 [JP] Japan ................................ 60-245976

[51] Int. Cl.$^4$ ........................ B05C 11/00; B05C 13/00
[52] U.S. Cl. ..................................... 118/669; 118/697;
118/500; 198/341; 198/345; 198/468.4; 901/7;
901/8; 901/43; 901/47; 414/225
[58] Field of Search .............. 118/697, 696, 680, 669,
118/500; 198/341, 468.4, 345; 414/225; 901/7,
8, 40, 47, 43

[56] References Cited

U.S. PATENT DOCUMENTS

| | | | |
|---|---|---|---|
| 3,168,184 | 2/1965 | Galvin | 901/7 X |
| 3,194,417 | 7/1965 | Dunsmore et al. | 198/468.4 |
| 3,701,643 | 10/1972 | Frank | 198/345 X |
| 3,818,290 | 6/1974 | Harper et al. | 901/7 X |
| 3,856,607 | 12/1974 | Faltot et al. | 198/468.4 |
| 3,926,297 | 12/1975 | Guenst, Jr. et al. | 198/341 |
| 3,960,276 | 6/1976 | Gerhardt | 198/468.4 X |
| 4,011,437 | 3/1977 | Hohn | 901/7 X |
| 4,044,377 | 8/1977 | Bowerman | 901/7 X |
| 4,105,925 | 8/1978 | Rossol et al. | 901/7 X |
| 4,228,886 | 10/1980 | Moran | 901/40 X |
| 4,228,993 | 10/1980 | Cathers | 198/468.4 X |
| 4,419,384 | 12/1983 | Kane et al. | 118/669 X |
| 4,458,628 | 7/1984 | Fujii et al. | 118/697 |
| 4,605,569 | 8/1986 | Shimada et al. | 427/284 X |
| 4,623,296 | 11/1986 | McGuire et al. | 901/7 X |
| 4,627,785 | 12/1986 | Monforte | 901/40 X |
| 4,639,878 | 1/1987 | Day et al. | 901/47 X |
| 4,663,658 | 5/1987 | Lanne et al. | 901/47 X |
| 4,667,805 | 5/1987 | Antoszewski | 198/345 |
| 4,669,168 | 6/1987 | Tamura et al. | 901/7 X |

Primary Examiner—Shrive P. Beck
Assistant Examiner—Alain Bashore
Attorney, Agent, or Firm—Gerald J. Ferguson, Jr.

[57] ABSTRACT

A plate member locating-and-feeding system comprises a locating system for locating a plate member fed to a locating station, a position sensor for detecting the position of the plate member located by the locating system, a suction feeding system for holding the locating plate member under a suction force and feeding it to a working station, a working robot provided at the working station for performing a predetermined process and a controller which stores regular working position data, and corrects the regular working position data on the basis of difference between the position data represented by the output signal of the position sensor and the regular working position data, and controls the working robot to perform the predetermined process according to the corrected working position data.

6 Claims, 8 Drawing Sheets

PLATE MEMBER LOCATING-AND-FEEDING SYSTEM

BACKGROUND OF THE INVENTION

1. Field of the Invention

This invention relates to a locating-and-feeding system for locating a plate member such as a windowpane for a vehicle and feeding it on before subjecting it to a predetermined process.

2. Description of the Prior Art

There is disclosed in, for instance, Japanese Unexamined Patent Publication No. 59(1984)-96072 a system in which a windowpane for a vehicle is shuttled to a working station to be delivered to a stationary lifter provided at the working station, and at the working station the windowpane is located and applied with primer or adhesive by a working robot according to a predetermined procedure.

However, the system is disadvantageous in that, since location of the windowpane and application of primer or adhesive are both performed at the working station, the working robot must wait until location of the windowpane is ended, and accordingly the cycle time is elongated.

SUMMARY OF THE INVENTION

In view of the foregoing observations and description, the primary object of the present invention is to provide plate member locating-and-feeding system in which the plate member fed to a working station can be immediately subjected to the process to be performed at the working station, thereby shortening the cycle time.

In accordance with the present invention, there is provided a plate member locating-and-feeding system comprising a locating means for locating a plate member fed to a locating station, a position detecting means for detecting the position of the plate member located by the locating means, a suction feeding means for holding the located plate member under a suction force and feeding it to a working station, a working means provided at the working station for performing a predetermined process and a control means which stores regular working position data, and corrects the regular working position data on the basis of difference between the position data represented by the output signal of the position detecting means and the regular working position data, and controls the working means to perform the predetermined process according to the corrected working position data.

In the system of the present invention, location of the plate member is performed at the locating station before the plate member is fed to the working station and only the predetermined process is performed at the working station. Accordingly, location of the plate member and the predetermined process are performed in parallel and the cycle time is shortened. Further, since the actual position of the plate member after location thereof is detected and the regular working position data on the basis of which the working means is controlled is corrected according to the actual position, the predetermined process can be properly performed on the plate member even if the position of the plate member after location is deviated from the regular position.

DESCRIPTION OF THE PREFERRED EMBODIMENT

Figure 1:
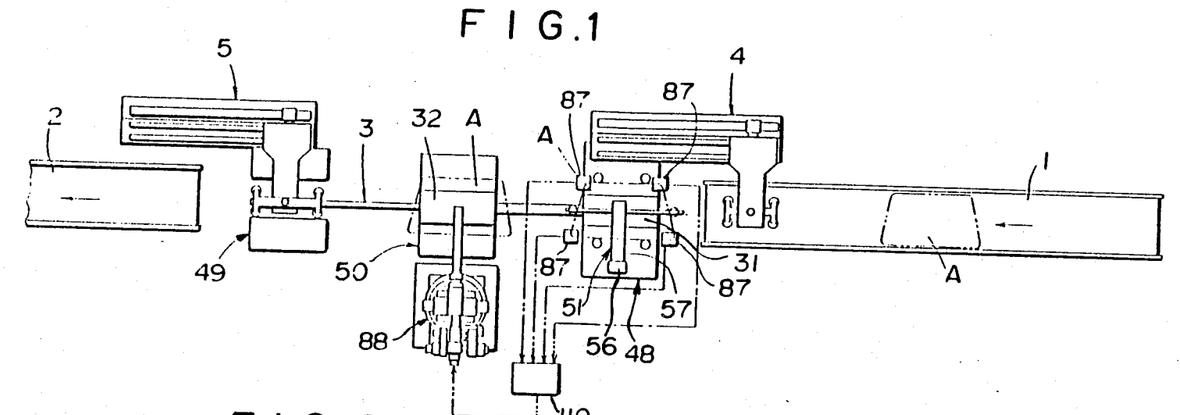
FIG. 1 is a schematic plane view showing a plate member locating-and-feeding system in accordance with an embodiment of the present invention.
Figure 2:
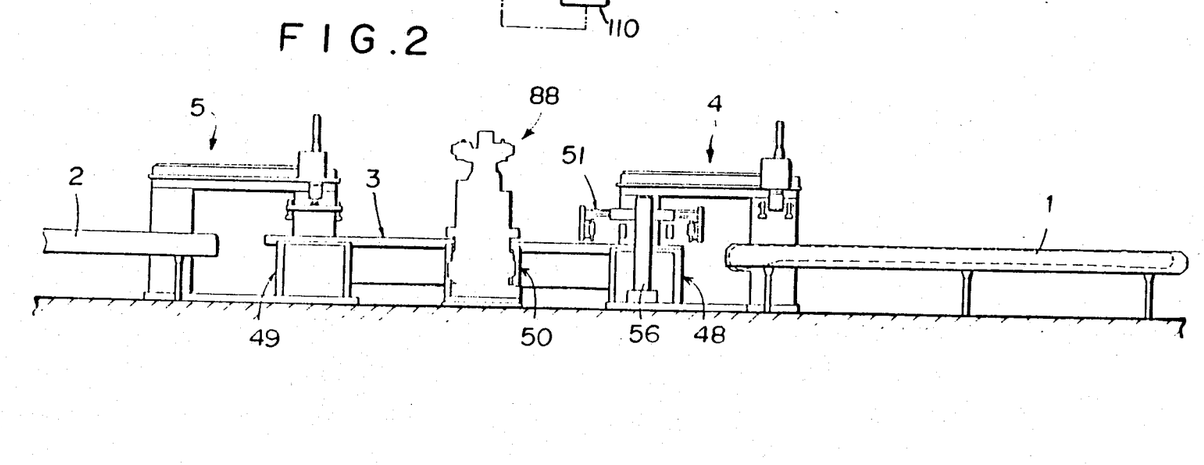
FIG. 2 is a front view of the system.

In FIGS. 1 and 2 showing a plate member locating-and-feeding system in accordance with an embodiment of the present invention in which the present invention is applied to locate and feed an automotive windowpane A in order to apply primer to the outer periphery of the windowpane A, a shuttling conveyor 3 is disposed between a feed-in conveyor 1 and a feed-out conveyor 2. Beside the downstream end of the feed-in conveyor 1 is disposed a first transfer device 4 for transferring the windowpane A fed in by the feed-in conveyor 1 to the shuttling conveyor 3, and beside the downstream end of the shuttling conveyor 3 is disposed a second transfer device 5 for transferring the windowpane A from the shuttling conveyor 3 to the feed-out conveyor 2.

Figure 3:
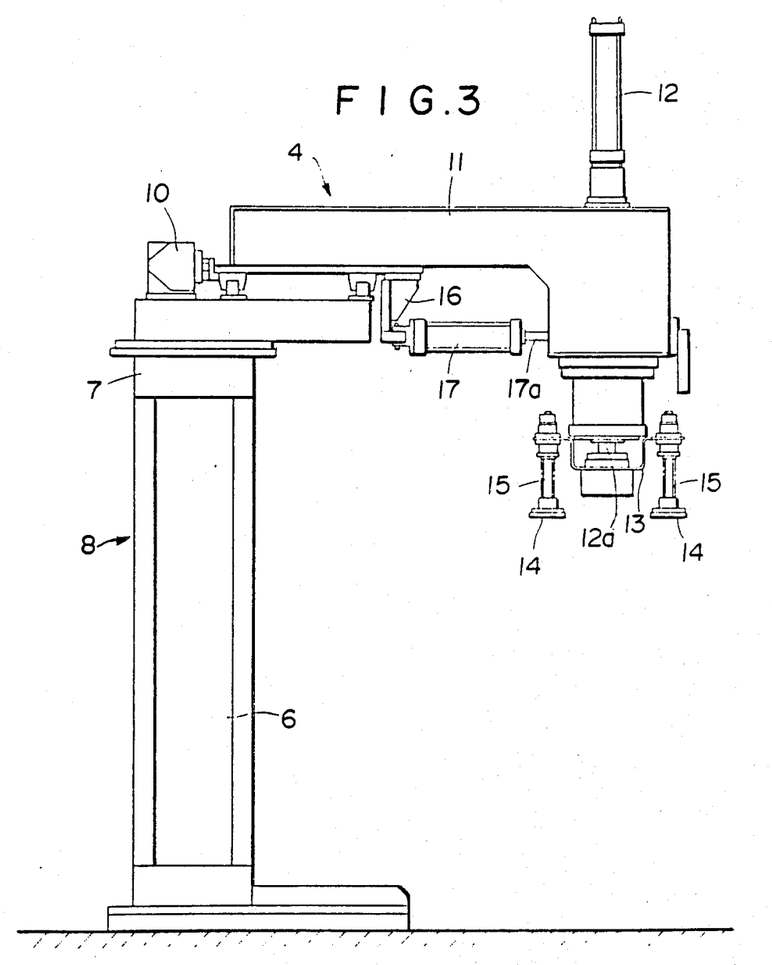
FIG. 3 is an enlarged side view of the first transfer device employed in the system.
Figure 4:
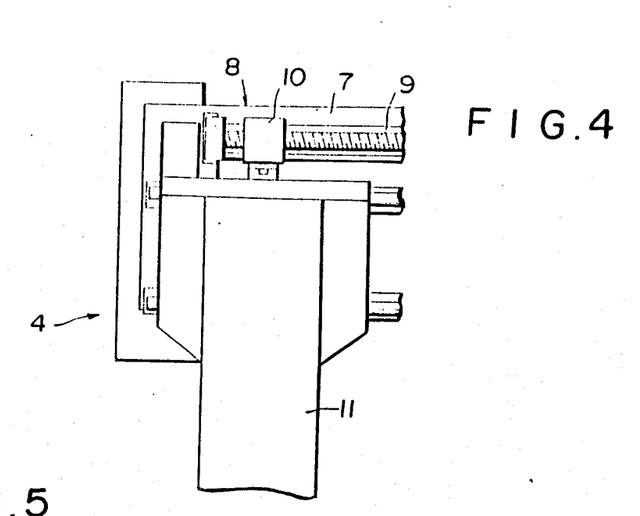
FIG. 4 is an enlarged fragmentary plan view of the first transfer device.

The first transfer device 4 comprises, as shown in detail in FIGS. 3 and 4, a support frame 8 formed of a pair of posts 6 and a connecting member 7 connecting the upper ends of the posts 6. An L-shaped arm member 11 is supported by the connecting member 7 in a cantilever fashion so that the free end of the arm member 11 is movable between a position above the downstream end of the feed-in conveyor 1 and a position above the upstream end of the shuttling conveyor 3. The base end portion of the arm member 11 is mounted on a sliding member 10 which is engaged with a screw shaft 9 extending in the longitudinal direction of the connecting member 7 so that the arm member 11 is moved back and forth toward upstream end of the shuttling conveyor 3 and toward the downstream end of the feed-in conveyor 1. A fluid pressure piston-cylinder mechanism 12 having a downwardly extending piston rod 12a is provided on the free end of the arm member 11, and a substantially H-shaped (as seen from above) bracket 13 is supported for rotation on the free end of the piston rod 12a. From each end portion of the bracket 13 is suspended a rod 15 which is normally spring-urged downward by a coil spring provided thereon and a suction pad 14 is mounted on the lower end of the rod 15. The suction pad 14 is connected to a vacuum pump (not shown) to attract the windowpane A under a vacuum force. The first transfer device 4 is provided with four such suction pads 14 (one on each end of the H-shaped bracket 13) to support the windowpane A at four points. A swinging piston-cylinder mechanism 17 having a horizontally extending piston rod 17a is mounted on the lower side of the arm member 11 by way of a bracket 16, and the free end of the piston rod 17a is connected to the bracket 13 by way of a link (not shown) so that the suction pads 14 are rotated by 90° about a rotational axis in response to expansion and contraction of the swinging piston-cylinder mechanism 17. Further, the suction pads 14 are moved up and down in response to expansion and contraction of the piston-cylinder mechanism 12.

The second transfer device 5 is the same as the first transfer device 4 in structure and accordingly, the parts of the second transfer device 5 corresponding to those of the first transfer device 4 are given the same reference numeral and will not be described.

Figure 5:
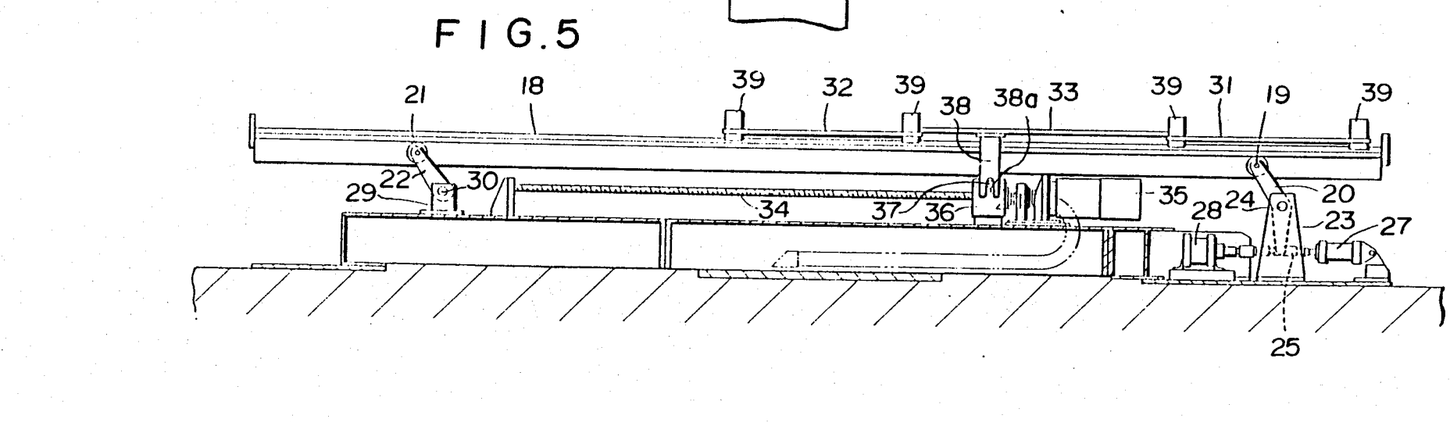
FIG. 5 is an enlarged front view of the shuttle feeding device employed in the system.
Figure 6:
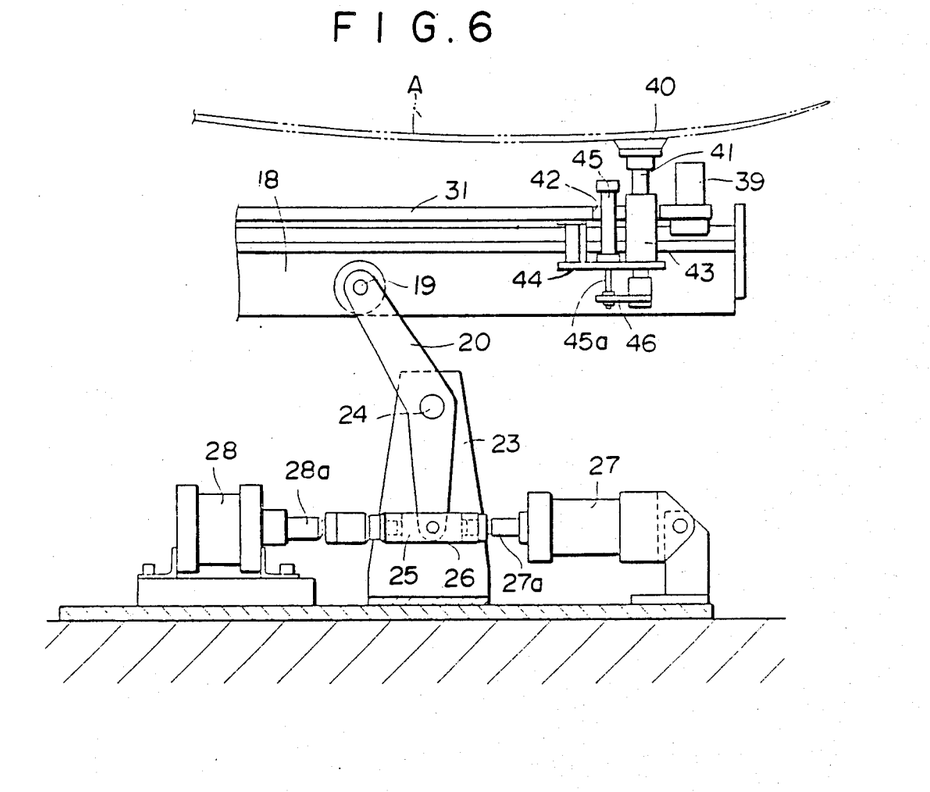
FIG. 6 is an enlarged fragmentary front view of the shuttle feeding device.
Figure 7:
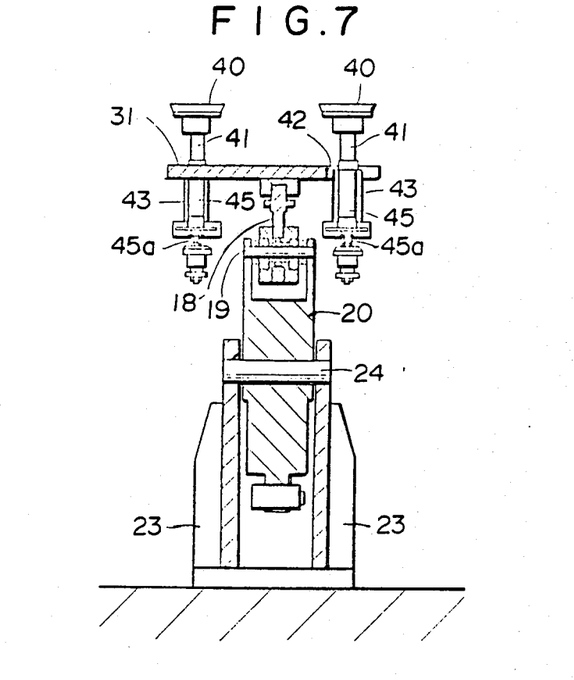
FIG. 7 is an enlarged cross-sectional view of the shuttle feeding device.

The shuttling conveyor 3 comprises, as shown in detail in FIGS. 5 to 7, a guide rail member 18 extending between the feed-in conveyor 1 and the feed-out conveyor 2. The guide rail member 18 is supported at a portion near the upstream end (the end on the feed-in conveyor side) by a first lever 20 and at a portion near the downstream end by a second lever 22 to extend horizontally at a predetermined height. The first lever 20 comprises upper and lower arms extending at an angle to each other, and is connected for rotation to the guide rail member 18 by way of a shaft 19 at the upper end of the upper arm. Further, the first lever 20 is supported at an intermediate portion or the junction of the upper and lower arms for rotation about a horizontal shaft 24 supported by a pair of support plates 23, and the lower end of the lower arm is connected for rotation to a joint 25 by way of a shaft 26. One end of the joint 25 is connected to a horizontal piston rod 27a of a fluid pressure piston-cylinder mechanism 27. Another fluid pressure piston-cylinder mechanism 28 having a horizontal piston rod 28a is opposed to the piston-cylinder mechanism 27 so that the free end of the pistor rod 28a is adapted to push the other end of the joint 25. In response to expansion and contraction of the piston-cylinder mechanisms 27 and 28, the first lever 20 is rotated about the horizontal shaft 24 to move the guide rail member 18 between an uppermost position for feed of the windowpane A, an intermediate portion for application of primer to be described later and for delivery and receipt of the windowpane A, and a lowermost position for returning action in shuttling and for location of the windowpane A. The second lever 22 is connected for rotation at the upper end to the guide rail member 18 by way of a shaft 21 and is connected for rotation at the lower end about a horizontal shaft 30 supported by a pair of support plates 29 so as to be swung in response to swinging motion of the first lever 20.

Further, as shown in FIG. 5, a pair of feed tables 31 and 32 are placed on the guide rail member 18 with the tables 31 and 32 being mutually connected by a connecting plate 33. A horizontal screw shaft 34 is provided below the guide rail member 18 to extend in the longitudinal direction in parallel to the guide rail member 18. One end of the screw shaft 34 is connected to the driving shaft of an electric motor 35. A sliding member 36 is engaged with the screw shaft 34. The sliding member 36 is provided with an engagement pin 37 horizontally projecting therefrom, and the engagement pin 37 is engaged with a slot 38a formed in an engagement plate 38 extending downward from the connecting plate 33. With this arrangement, the first and second feed tables 31 and 32 are moved along the guide rail member 18 by the electric motor 35 by way of the screw shaft 34 and the sliding member 36.

Figure 8:
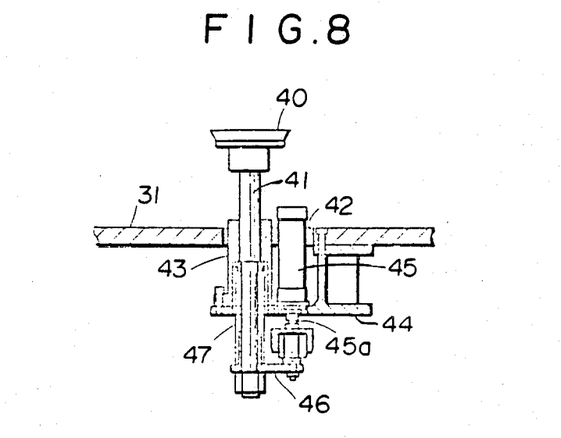
FIG. 8 is an enlarged fragmentary front view of the suction pad and a part of the first feed table employed in the system.
Figure 9:
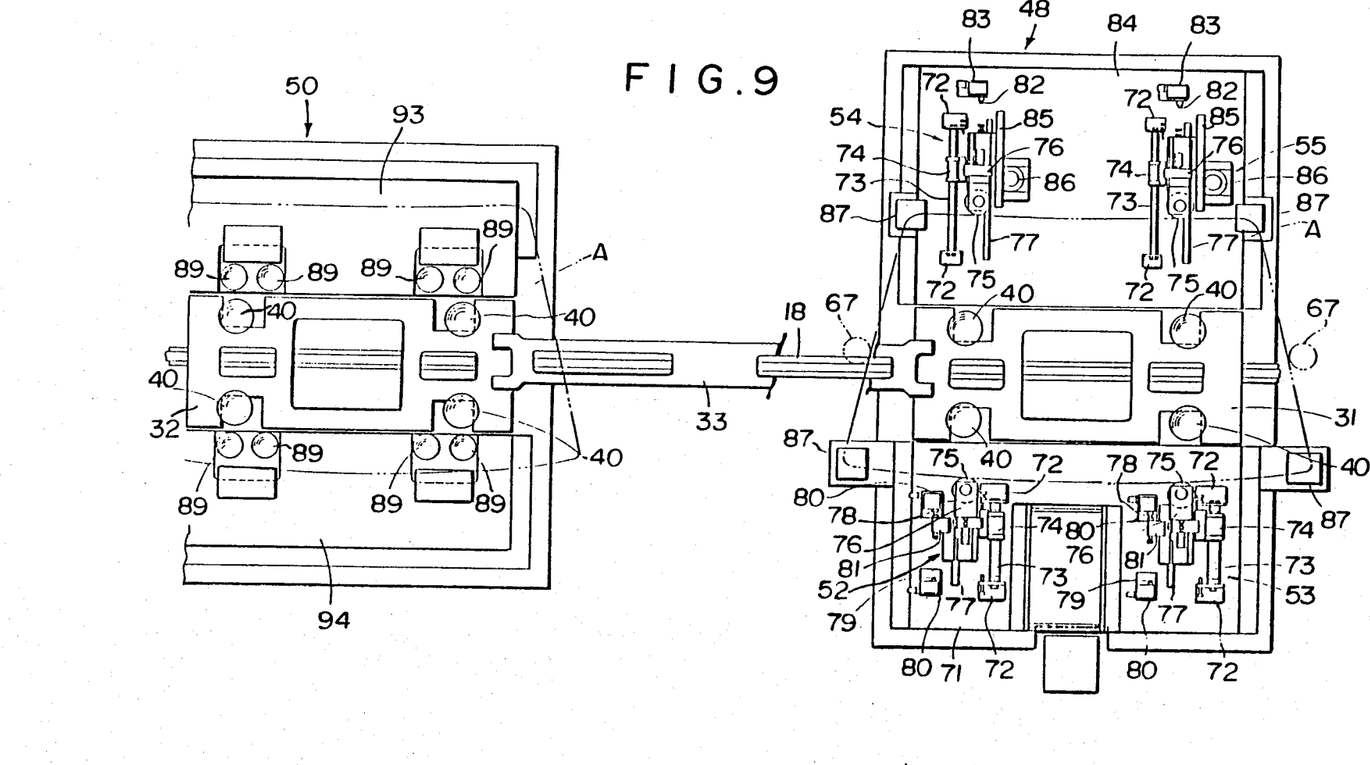
FIG. 9 is an enlarged plan view showing the locating station and the working station employed in the system.

Four cushioning members 39, which may be of elastic material such as rubber, are fixed to the upper surface of each feed table at the respective corners and a suction pad 40 for attracting the windowpane A on the rear side is disposed in the vicinity of each cushioning member 39 as shown in FIGS. 6 and 9. The arrangement of the suction pads 40 on the first feed table 31 will be described hereinbelow. The arrangement of the suction pads 40 on the second feed table 32 is the same as that on the first table and accordingly will not be described here. As shown in FIG. 8, the suction pads 40 are respectively fixed to the top ends of rods 41. Each rod 41 is fitted into a tubular member 43 disposed in an opening 42 formed in the vicinity of each corner of the first feed table 31. The tubular member 43 is mounted on the first feed table 31 by way of a bracket 44. A fluid pressure piston-cylinder mechanism 45 having a downwardly extending piston rod 45a is mounted on the bracket 44 and the free end of the piston rod 45a is connected to the lower end of the rod 41 by way of a connecting member 46 so that the suction pad 40 is moved up and down in response to expansion and contraction of the piston-cylinder mechanism 45. A coil spring 47 is provided around the lower half of the rod 41 to prevent abrupt upward movement of the suction pad 40 upon contraction of the piston-cylinder mechanism 45. Each suction pad 40 is connected to a vacuum pump (not shown) to attract the windowpane A on the lower side.

A locating station 48 for locating the windowpane A is set at an upstream side portion of the shuttling conveyor 3 and a delivery station 49 is set at a downstream side portion of the same. A working station 50 for applying primer to the outer periphery of the windowpane A is set between the locating station 48 and the delivery station 49. The spaces between the locating station 48 and the working station 50 and between the working station 50 and the delivery station 49 are equal to each other, and the spaces are selected so that when the first feed table 31 is positioned at the locating station 48 the second feed table 32 is positioned at the working station 50, and when the first feed table 31 is positioned at the working station 50 the second feed table 32 is positioned at the delivery station 49.

Figure 10:
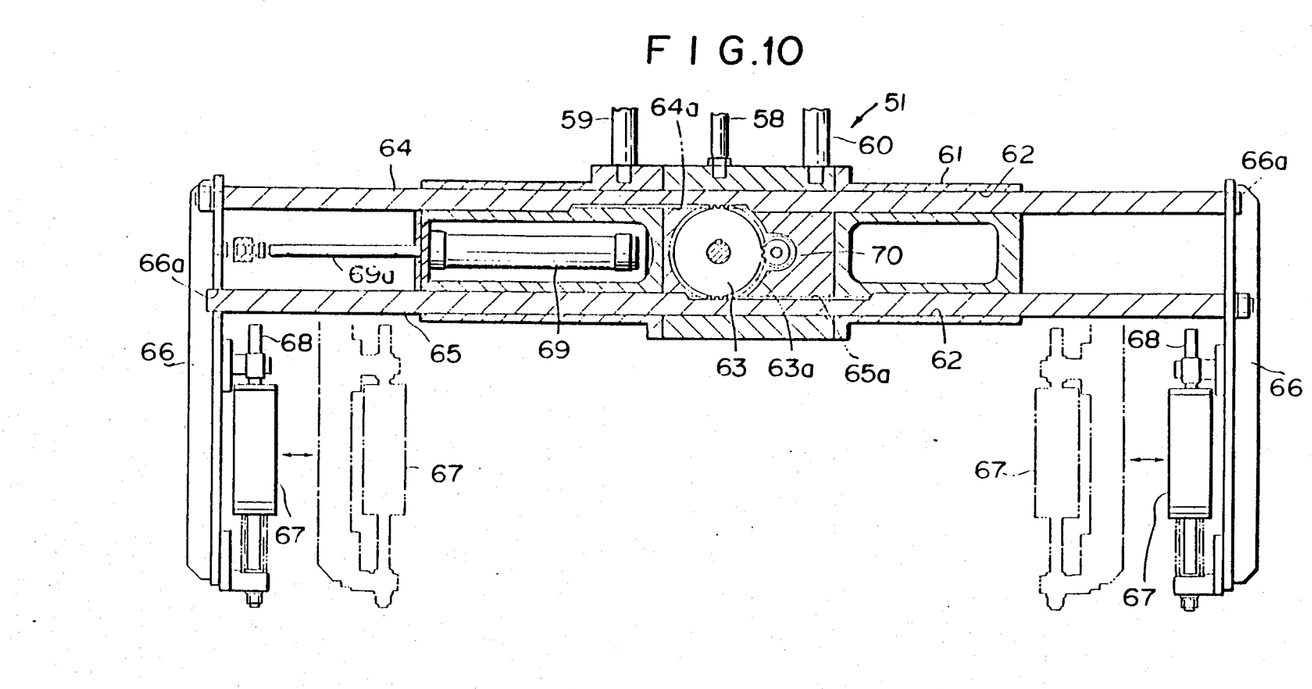
FIG. 10 is an enlarged fragmentary front view of the first locating device employed in the system.

At the locating station 48 is disposed, as shown in FIGS. 1, 2 and 9, a locating system comprising first to fifth locating devices 51 to 55 for locating the windowpane A which is fed in by the feed-in conveyor 1 and is transferred to the first feed table 31 at the locating station 48 by the first transfer device 4. The first locating device 51 includes an arm member 57 which is mounted on a support post 56 to horizontally extend at the center of the locating station 48 and to be moved up and down by a driving mechanism not shown. On the free end of the arm member 57 is fixedly mounted a guide plate member 61 by way of three rods 58 to 60 as shown in FIG. 10. The guide plate member 61 is provided with upper and lower horizontal bores 62, and upper and lower sliding rod members 64 and 65 are slidably fitted into the respective bores 62. A large gear 63 is supported for rotation between the upper and lower sliding rod members 64 and 65. The large gear 63 has teeth 63a in mesh with racks 64a and 65a respectively formed on the sliding rod members 64 and 65 at intermediate portions. Thus, the sliding rod members 64 and 65 are slid in opposite directions in response to rotation of the large gears 63. The sliding rod members 64 and 65 are respectively provided with rollers 67 mounted for rotation about vertical shafts 68 by way of brackets 66 at ends remote from each other. Each of the rod members 64 and 65 is loosely received in an opening 66a formed in the bracket 66 fixed to the other rod member.

A fluid pressure piston-cylinder mechanism 69 having a piston rod 69a is mounted on the guide plate member 61 and the free end of the piston rod 69a is fixed to the left bracket 66 so that the large gear 63 is rotated in response to expansion and contraction of the piston-cylinder mechanism 69 by way of the upper rod member 64. That is, when the piston-cylinder mechanism 69 is expanded, the large gear 63 is rotated in the counterclockwise direction and accordingly the rollers 67 carried by the upper and lower rod members 64 and 65 are moved away from each other. On the other hand, when the piston-cylinder mechanism 69 is contracted, the large gear 63 is clockwisely rotated and the rollers 67 are moved toward each other. Thus, the windowpane A is laterally located. A small gear 70 is in mesh with the large gear 63, and increase in the rotational load of the small gear 70 due to abutment of the rollers 67 against the outer periphery of the windowpane A is detected by a pickup (not shown) and the fluid pressure piston-cylinder mechanism 69 is controlled on the basis of the detecting signal of the pickup.

As best seen in FIG. 9, the second and third locating devices 52 and 53 are disposed on one side of the guide rail member 18 and the fourth and fifth locating devices 54 and 55 are disposed on the other side of the guide rail member 18. The second and third locating devices 52 and 53 determine a reference for location of the windowpane A on the first feed table 31 and the fourth and fifth locating devices 54 and 55 locate the windowpane A with respect to the reference determined by the second and third locating device 52 and 53 on the first feed table 31, whereby the windowpane A is longitudinally located.

The second and third locating devices 52 and 53 are the same in structure and the fourth and fifth locating devices 54 and 55 are the same in structure. Accordingly, only the second locating device 52 and the fifth locating device 54 will be described, hereinbelow.

The second locating device 52 comprises a slide bar 73 supported on a stationary table 71 at the locating station 48 by a pair of support members 72 to horizontally extend perpendicular to the guide rail member 18, and a rod-less cylinder 74 slidable on the slide bar 73. To the rod-less cylinder 74 is fixed a locating member 76 on which a roller 75 is supported for rotation. The locating member 76 is moved on the stationary table 71 under the guidance of a guide rail 77 by operation of the rod-less cylinder 74 to move the roller 75 toward and away from the outer periphery of the windowpane A. First and second sensors 78 and 79 are mounted on the stationary table 71 by way of mounting members 80 on the outer side of the locating member 76 to be opposed to each other. When a projecting piece 81 on the locating member 76 abuts against the first sensor 78 during forward movement of the rod-less cylinder 74, the rod-less cylinder 74 is stopped, whereby the roller 75 is moved to said reference position. Similarly, the rearward movement of the rod-less cylinder 74 is limited by the second sensor 79, that is, a predetermined retracted position of the roller 75 is defined by the second sensor 79.

Similarly to the second locating device 52, the fourth locating member 54 is arranged to move back and forth a roller 75 by operation of a rod-less cylinder 74. A third sensor 82 is mounted on a stationary table 84 by way of a mounting member 83 behind the roller 75. When a locating member 76 of the roller 75 abuts against the third sensor 82 during rearward movement of the rod-less cylinder 74, tte rod-less cylinder 74 is stopped, thereby locating the roller 75 in a predetermined retracted position. A rack 85 is mounted on the locating member 76 of the fourth locating device 54, and a pinion 86 in mesh with the rack 85 is supported for rotation on the stationary table 84. When the roller 75 is moved forward driven by the rod-less cylinder 74 and increase in the rotational load of the pinion 86 due to abutment of the roller 75 against the outer periphery of the windowpane A is detected by a pickup (not shown), the rod-less cylinder 74 is stopped.

Thus, the windowpane A fed in to the locating station 48 carried by the first feed table 31 is laterally located by the first locating device 51 and is longitudinally located by the second to fifth locating devices 52 to 55.

Further, at the locating station 48 are disposed four visual sensors 87 which detect the position of the four corners of the windowpane A located by the first to fifth locating devices 51 to 55 and which may be a television camera. A position signal representing the position of the windowpane A after location as detected by the visual sensors 87 is input into a controller 110 which controls a multi-articulated working robot 88 provided at the working station 50.

The working robot 88 is for applying primer to the outer periphery of windowpane A shuttled to the working station 50 by the first feed table 31 after location at the locating station 48. The controller 110 stores regular working position data on the basis of which application of primer to the windowpane is to be performed at the working station 50. The controller 110 compares the regular working position data with the position of the windowpane A after location as represented by the position signal input from the visual sensors 87 and calculates the difference therebetween. Further, the controller 110 corrects the regular working position data using the difference as a correction value. The corrected regular working position data is stored until the windowpane A located at the locating station 48 is fed to the working station 50, and the controller 110 controls the working robot 88 to apply primer to the windowpane A on the basis of the corrected regular working position data at the working station 50.

Figure 11:
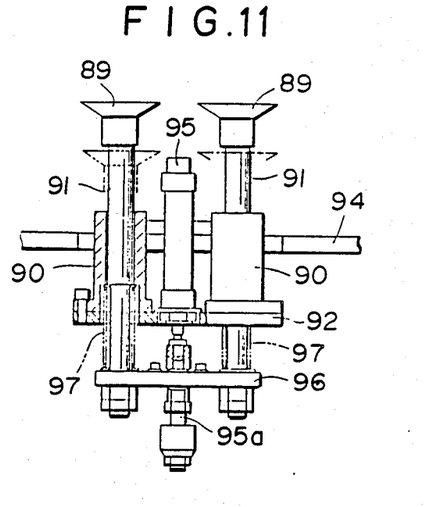
FIG. 11 is an enlarged fragmentary front view showing the suction pad and the stationary table on the working station side.
Figure 12:
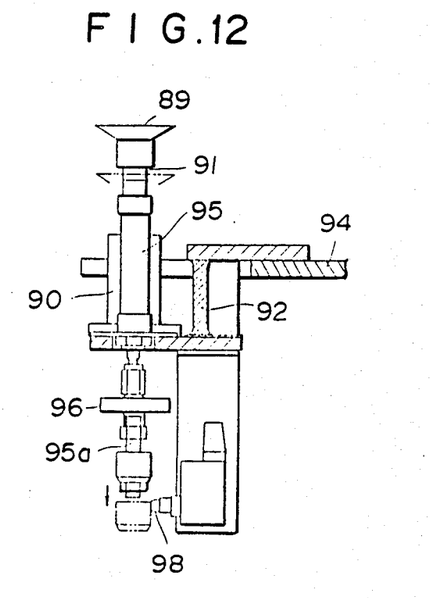
FIG. 12 is an enlarged side view of the same.

As shown in FIG. 9, four pairs of suction pads 89 are disposed at the working station 50, two pairs on each side of the feed table positioned at the working station 50. Two pairs of suction pads 89 on the upper side (as seen in FIG. 9) are mounted on a stationary table 93 and the other two pairs on the lower side are mounted on a stationary table 94. As clearly shown in FIGS. 11 and 12, each suction pad 89 is fixed to the upper end of a rod 91 received in a tubular member 90 which is mounted on the stationary table 93 or 94 by way of bracket 92 so that the suction pad 89 projects upward from the stationary table. A pair of the tubular members 90 are mounted on the stationary table by way of a single bracket 92, and a fluid pressure piston-cylinder mechanism 95 is mounted on the bracket 92 between the tubular members 90. The piston-cylinder mechanism 95 has a downwardly extending piston rod 95a and the piston rod 95a is connected to the lower ends of the pair of the rods 91 by way of a connecting member 96 so that the suction pads 89 on the rods 91 are moved up and down in response to expansion and contraction of the piston-cylinder mechanism 95. By contracting the piston-cylinder mechanism 95 to move upward the suction pads 89 with vacuum fed to the suction pads 89, the windowpane A applied with primer by the robot 88 at the working station 50 is lifted away from the first feed table 31 held by the suction pads 89 under vacuum force, and by subsequently expanding the piston-cylinder mechanism 95 to move downward the suction pads 89 and by releasing the vacuum of the suction pads 89, the windowpane A is placed on the second feed table 32 which has been moved to the working station 50. Though not shown, the suction pads 89 are connected to a vacuum pump to draw the windowpane A on the lower side. A coil spring 97 is provided around the lower half of the rod 91 to prevent abrupt upward movement of the suction pad 89 upon contraction of the piston-cylinder mechanism 95. Reference numeral 98 denotes a sensor for defining the lowermost position of the suction pad 89.

The operation of the locating-and-feeding system of this embodiment will be described, hereinbelow.

(1) First it is assumed that the first feed table 31 loaded with no windowpane is positioned at the locating station 48 and the second feed table 32 loaded with a located windowpane A is positioned at the working station 50, with the guide rail member 18 in the intermediate position. Then when another windowpane A is fed to the downstream end of the feed-in conveyor 1, the piston-cylinder mechanism 12 is expanded to move downward the suctions pads 14 of the first transfer device 4 and the suction pads 14 draw the windowpane on the upper side thereof under vacuum force. Thereafter, the piston-cylinder mechanism 12 is contracted to move upward the suction pads 14, thereby lifting the windowpane, and the arm member 11 is slid to the locating station 48. Then the piston-cylinder mechanism 12 is contracted to lower the suction pads 14 and vacuum of the suction pads 14 is released, whereby the windowpane is transferred to the first feed table 31 at the locating station 48.

(2) After vacuum of the suction pads 14 is released, the first transfer device 14 returns to the original position in the reverse procedure. Then the piston-cylinder mechanism 27 is operated to move the guide rail member 18 to the lowermost position. In this state, the rodless cylinders 74 of the second and third locating devices 52 and 53 are moved forward to bring the rollers 75 of the respective locating devices to the reference positions. Subsequently, the arm member 57 of the first locating device 51 is moved downward, and the piston-cylinder mechanism 69 is contracted to move the rollers 67 toward each other to sandwich the windowpane A therebetween, thereby laterally locating the windowpane A. The rod-less cylinders 74 of the fourth and fifth locating devices 54 and 55 are moved forward to bring the rollers 75 into abutment against the outer periphery of the windowpane A, thereby longitudinally locating the windowpane A. Thereafter, the piston-cylinder mechanisms 45 of the first feed table 31 are expanded to move upward the suction pads 40 and the suction pads 40 draws the windowpane A on the lower side. The position of the windowpane A thus located is detected by the visual sensors 87 and a detecting signal is input into the controller 110.

(3) Then the piston-cylinder mechanism 27 is operated to move the guide rail member 18 to the uppermost position, and the motor 35 is energized to move the sliding member 36 in the longitudinal direction of the screw shaft 34, thereby shuttling the second feed table 32 from the working station 50 to the delivery station 49 and the first feed table 31 from the locating station 48 to the working station 50.

(4) Then, the guide rail member 18 is moved to the intermediate position and the windowpane A on the first feed table 31 is applied with primer by the robot 88 at the working station.

At this time, the windowpane A is fed to the working station 50 as it is located at the locating station 48, so locating accuracy cannot be adversely affected during transfer of the windowpane A. Further, since the actual position of the windowpane A after location at the locating station 48 is detected by the visual sensors 87 and the regular working position data stored in the controller 110 is corrected according to the difference between the actual position and the regular working position data and the robot 88 is controlled on the basis of the corrected working position data, application of primer by the robot 88 can be properly performed even if the position of the located windowpane A is deviated from the regular position.

While primer is applied to the windowpane A at the working station 50, the windowpane on the second feed table 32 at the delivery station 49 is transferred to the feed-out conveyor 2 by the second transfer device 5. The second transfer device 5 works in a manner similar to that of the first transfer device 4.

After transferring the windowpane A to the locating station 50, the first transfer device 4 takes another windowpane A fed by the feed-in conveyor 1 and waits above the locating station 48.

(5) The windowpane A which has been applied with primer is lifted above the stationary tables 93 and 94 by means of the suction pads 89 and the piston-cylinder mechanism 95 to prevent interference with the first and second feed tables 31 and 32 moved along the guide rail member 18.

(6) Thereafter, the guide rail member 18 is moved to the lowermost position. In this state, the first feed table 31 which is vacant is shuttled to the locating station 48 from the working station 50 and the second feed table 32 which is also vacant is shuttled to the working station 50 from the delivery station 49. Then the guide rail member 18 is again moved to the intermediate position and the windowpane A waiting above the locating station 48 is placed on the first feed table 31, while the windowpane A which has been lifted above the stationary tables 93 and 94 in (5) is moved downward by contraction of the piston-cylinder mechanism 95 to be held on the second feed table 32 by the suction pads 40, and primer is applied thereto by the robot 88 in the manner similar to that described in (4).

In this manner, a plurality of windowpanes A are successively located and the applied with primer.

As can be understood from the description above, while one windowpane is applied with primer at the working station 50, another windowpane can be located at the locating station 48. That is, location of a windowpane and application of primer to another windowpane can be performed in parallel, and accordingly the cycle time can be shortened to the time required for application of primer.

Though in the embodiment described above the present invention is applied to primer application to an automotive windowpane, the present invention can be applied to various other purposes.

We claim:

1. A plate member locating-and-feeding system comprising a locating means for locating a plate member fed to a locating station where said locating means locates the plate member to a position at least near a regular position represented by regular working position data by pushing in a predetermined motion a side surface of the plate member fed to the locating station and where said locating station is provided with a first holding means for holding the plate member at the locating station after the plate member is located by the locating means, a position detecting means for detecting the position of the plate member located by the locating means, a suction feeding means for holding the located plate member under a suction force and feeding it to a working station where said locating station is disposed in front of and separated from said working station and where said working station is provided with a second holding means for holding the plate member fed to the working station by the suction feeding means, and the suction feeding means is arranged to release the plate member after the plate member is fixed by the second holding means, a working means provided at the working station for performing a predetermined process and a control means which stores said regular working position data, and corrects the regular working position data on a basis of difference between the position data represented by an output signal of the position detecting means and the regular working position data to obtain corrected working position data, and controls the working means to perform the predetermined process according to the corrected working position data.

2. A plate member locating-and-feeding system as defined in claim 1 in which said position detecting means detects the position of the plate member located by the locating means by way of the position of corners of the plate member.

3. A plate member locating-and-feeding system as defined in claim 2 in which said position detecting means comprises a visual sensor.

4. A plate member locating-and-feeding system as defined in claim 3 in which said plate member is an automotive windowpane and said working means comprises a primer application device.

5. A plate member locating-and-feeding system as defined in claim 1 in which the position detecting means detects the position of the plate member held by the first holding means after said plate member is roughly located by the locating means.

6. A plate member locating-and-feeding system as defined in claim 1 including means for continuously feeding a plurality of the plate members to the locating station and from the working station.

* * * * *